(No Model.) 2 Sheets—Sheet 1.

J. H. DUNBAR.
SECURING TEETH TO CYLINDERS.

No. 526,304. Patented Sept. 18, 1894.

WITNESSES
R. Schleicher.
Hamilton D. Turner.

INVENTOR
John H. Dunbar
By his Attorneys
Howson & Howson (No Model.) 2 Sheets—Sheet 2.

J. H. DUNBAR.
SECURING TEETH TO CYLINDERS.

No. 526,304. Patented Sept. 18, 1894.

WITNESSES.
R. Schleicher
Hamilton D. Turner

INVENTOR.
John H. Dunbar
By his Attorneys
Howson & Howson

THE NORRIS PETERS CO., PHOTO-LITHO., WASHINGTON, D. C.

UNITED STATES PATENT OFFICE.

JOHN H. DUNBAR, OF PHILADELPHIA, PENNSYLVANIA.

SECURING TEETH TO CYLINDERS.

SPECIFICATION forming part of Letters Patent No. 526,304, dated September 18, 1894.

Application filed December 29, 1893. Serial No. 495,028. (No model.)

*To all whom it may concern:*

Be it known that I, JOHN H. DUNBAR, a citizen of the United States, residing in Philadelphia, Pennsylvania, have invented certain Improvements in Securing Teeth to Cylinders, of which the following is a specification.

The object of my invention is to securely fasten the teeth to the cylinders of machines for breaking ice or other material so that the teeth will be securely fastened in place but can be readily removed when necessary.

The invention relates particularly to machines adapted to break ice into small pieces for use by manufacturers of ice cream and for refrigerating purposes, but it will be understood that it may be used for breaking ice for any purpose and may be used on other breakers as well.

Figure 1:
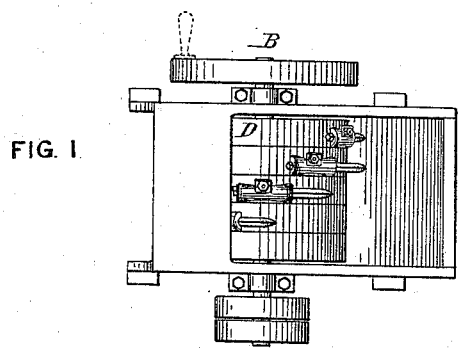
Figure 2:
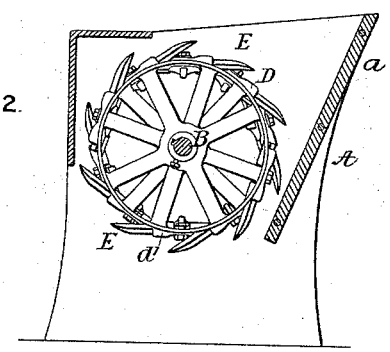
Figure 4:
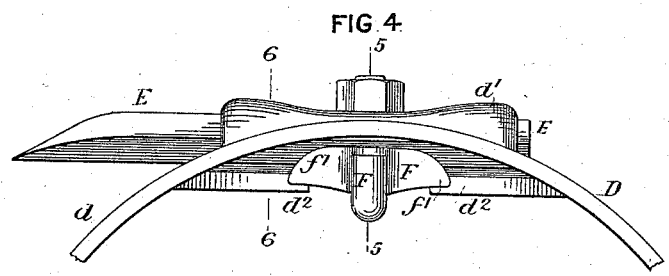
Figure 6:
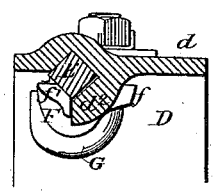
Figure 5:
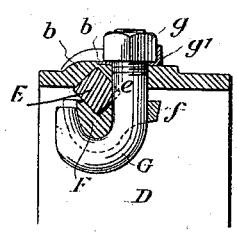
Figure 3:
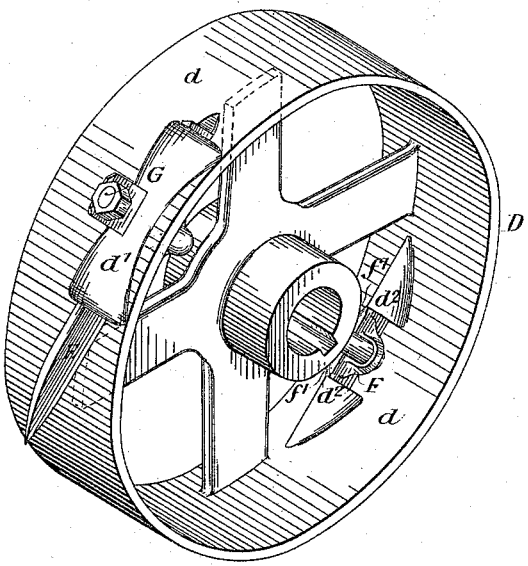
Figure 7:
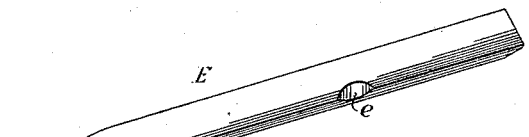
Figure 8:
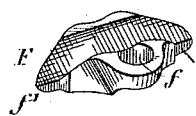
Figure 9:
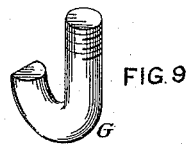
Figure 10:
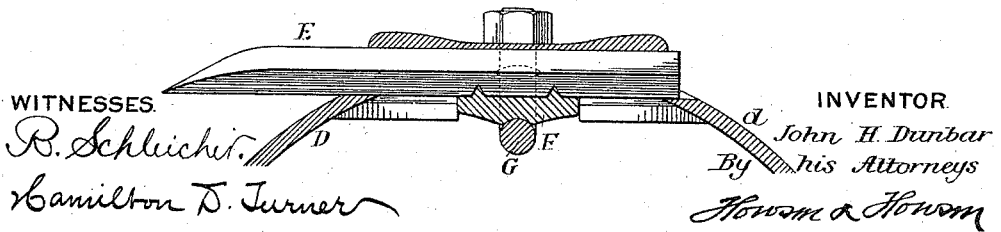

In the accompanying drawings:—Figure 1, is a plan view of my improved ice breaking machine. Fig. 2, is a sectional elevation. Fig. 3, is a perspective view of one of the cylinders detached. Fig. 4, is a side view of a portion of one of the cylinders, showing the clamping device for the teeth. Fig. 5, is a section on the line 5—5, Fig. 4. Fig. 6, is a section on the line 6—6, Fig. 4. Fig. 7, is a perspective view of one of the teeth. Fig. 8, is a perspective view of the shoe. Fig. 9, is a perspective view of the clamp bolt; and Fig. 10, is a modification of the invention.

A is the frame of the machine.

B is a shaft mounted in bearings in the frame of the machine and on this shaft are secured the drum sections D having hubs, spokes and rims, as clearly shown in Fig. 3. These sections are placed upon the shaft, as shown in Fig. 1, so as to form a drum extending from side to side of the machine and between the drum and the inclined sides $a$ is formed the hopper for the ice to be broken up.

On the shaft B are preferably mounted fast and loose pulleys and a balance wheel to which can be adapted a handle when the machine is used for a hand machine. Each drum section D has two teeth one directly opposite the other and the drum sections are so arranged upon the shafts that the teeth will strike in succession rather than simultaneously so as to distribute the shock. As the drum sections are identical I will simply describe in detail one drum section, referring particularly to Figs. 3, 4 and 5.

In the rim $d$ of the drum section are formed tangential sockets $d'$ for the reception of the teeth E. Shown clearly in Fig. 6. The teeth are preferably quadrangular in cross section as shown in Fig. 5, and each pocket is made to conform to the shape of the tooth.

In order to positively lock the tooth in the socket I mount under the tooth a shoe F (Fig. 8) which is V-shaped and conforms to the shape of the under side of the tooth. This shoe is forced against the tooth by a hooked bolt G (Fig. 9) which is fitted to a pocket in the shoe, the long end of the bolt passing up through the rim. This end of the bolt is screw threaded and adapted to the screw thread is a nut $g$ which after it is adjusted in position is locked by turning up a portion of the washer $g'$ (Fig. 5).

The tooth E is notched at $e$ and the bolt when adjusted in position rests in this notch so as to prevent any longitudinal movement of the tooth in the socket. The bolt passes through an opening $f$ in the shoe so that it will be held rigidly in place.

On the under side of the socket are extension lugs $d^2$ (Figs. 4 and 6) against which the portions $f'$ of the shoe rest so as to keep the shoe in line with the socket and prevent the tooth from twisting when strained, as the object is to force the upper sides of the tooth against the V-shaped walls $b\ b$ of the socket (Fig. 5) thus insuring an accurate fit. In some instances the lower portion of the tooth may be notched as shown in Fig. 10, and lugs may be formed on the shoe to engage with the notches and these notches and lugs may be used either with a tooth having the notch $d$ or without the notch. The projection forming the socket for the tooth extends sufficiently beyond the rim as to form a protection for the nut $g$, as clearly shown in Fig. 4, but in any event the tooth makes a path for the nut and projection so that the nut will not strike and become bruised. By this construction the nut can be readily tightened without dismantling the machine and a tooth can be removed or readily adjusted.

I claim as my invention—

1. The combination of the cylinder, the tangential socket therein, the tooth adapted to and inclosed by said socket, a shoe resting against the under side of the tooth, and a bolt for forcing the shoe against the tooth and the tooth against the upper surface of the socket, substantially as described.

2. The combination of the cylinder, the tangential socket therein, having V-shaped upper bearings, a tooth adapted to said socket and shaped to conform to the bearing, a shoe and a bolt for clamping the tooth in the socket, substantially as described.

3. The combination of the cylinder, the tangential socket therein, the tooth adapted to and inclosed by said socket, a notch in said tooth, a clamping device adapted to clamp the tooth in the socket and to enter the notch in the tooth preventing longitudinal movement of said tooth in the socket, substantially as described.

4. The combination of the cylinder, the tangential socket therein, a tooth adapted to said socket, said tooth being notched, a shoe resting against the under side of the tooth and a hooked bolt passing under the shoe and a nut on said bolt, the bolt passing into the notch in the tooth preventing longitudinal movement of said tooth, substantially as described.

5. The combination of the cylinder, socket therein, the socket having a quadrangular opening, a tooth quadrangular in cross section adapted to the socket, lugs $d^2$ on the interior of the cylinder, a shoe adapted to the under side of the tooth and having portions $f'$ bearing against the lugs so as to keep the shoe central, with a confining bolt adapted to force the shoe against the tooth and the tooth against the upper V-shaped portion of the socket so that it will have a firm seat within the socket, substantially as described.

In testimony whereof I have signed my name to this specification in the presence of two subscribing witnesses.

JOHN H. DUNBAR.

Witnesses:
 WILLIAM A. BARR,
 JOSEPH H. KLEIN.